United States Patent [19]

Sanderson et al.

[11] Patent Number: 5,465,620
[45] Date of Patent: Nov. 14, 1995

[54] MICROMECHANICAL VIBRATORY GYROSCOPE SENSOR ARRAY

[75] Inventors: Arthur C. Sanderson, Williamstown, Mass.; Edward W. Maby, Troy, N.Y.

[73] Assignee: Rensselaer Polytechnic Institute, Troy, N.Y.

[21] Appl. No.: 77,345

[22] Filed: Jun. 14, 1993

[51] Int. Cl.$^6$ .................................................. G01P 9/04
[52] U.S. Cl. ..................................................... 73/504
[58] Field of Search ....................................... 73/504, 505

[56] References Cited

U.S. PATENT DOCUMENTS

| | | | |
|---|---|---|---|
| 3,106,847 | 10/1963 | Mullins, Jr. et al. | 73/505 |
| 3,127,775 | 4/1964 | Hansen et al. | 73/505 |
| 3,270,566 | 9/1966 | Cenitch et al. | 74/5.6 |
| 4,019,391 | 4/1977 | Ljung | 73/505 |
| 4,644,793 | 2/1987 | Church | 73/505 |
| 5,056,366 | 10/1991 | Fersht | 73/505 |
| 5,131,273 | 7/1992 | Tabata | 73/505 |
| 5,172,599 | 12/1992 | Woltering | 74/61 |
| 5,203,208 | 4/1993 | Berntsein | 73/505 |

OTHER PUBLICATIONS

Lyman, Joseph, "A New Space Rate Sensing Instrument", Aeronautical Engineering Review, pp. 24–30, Nov. 1953.
Morrow, Charles T., "Steady State Response of the Sperry Rate Gyrotron or Vibratory Gyroscope", Journal of the Acoutical Society of America, vol. 27, No. 1, pp. 56–61, Jan. 1955.
Morrow, Charles T., "Response of the Sperry Rate Gyrotron to Varying Rates of Turn", vol. 27, No. 1, pp. 62–67, Jan. 1955.
Jan Soderkvist, "Design of a Solid–State Gyroscopic Sensor Made of Quartz", Sensor and Actuators, A21 A23, pp. 293–296, 1990.
Nathanson et al., "The Resonant Gate Transistor", IEEE Transactions on Electron Devices, vol. Ed. 141, No. 3, pp. 117–133, Mar. 1967.

Primary Examiner—Hezron E. Williams
Assistant Examiner—Christine K. Oda
Attorney, Agent, or Firm—Heslin & Rothenberg

[57] ABSTRACT

A micromechanical gyroscopic sensor array for detecting rotational movement includes a plurality of vibrational microgyroscopic sensing elements fixedly oriented in a common plane relative to one another such that an in-plane direction and an out-of-plane direction orthogonal thereto are defined. A mechanism for driving each microgyroscopic sensing element at a predetermined in-plane drive frequency is provided. Each sensing element has a predefined out-of-plane resonant frequency selected such that a range of in-plane frequencies and/or out-of-plane resonant frequency differences exist among the sensing elements. A resonant gate transistor is associated with each sensing element for sensing out-of-plane motion and producing a sense signal representative thereof. Signal processing then converts the sense signal to a signal representative of rotational movement experienced by the micromechanical gyroscopic sensor array. A learning function can be added to the sensor array by associating adjustable weights with each sensing element and employing a neural network having feedback control of the adjustable weights.

21 Claims, 5 Drawing Sheets fig. 1a fig. 1b fig. 2 fig. 3 fig. 4 fig. 6 fig. 7 fig. 5

MICROMECHANICAL VIBRATORY GYROSCOPE SENSOR ARRAY

TECHNICAL FIELD

The present invention relates in general to gyroscopes, and in particular, to micromechanical vibratory gyroscope sensors connected in an array structure and fabricated on a single substrate.

BACKGROUND ART

Vibratory gyroscopes are well known in the art (for example, reference U.S. Pat. Nos. 4,019,391 and 4,644,793). Such gyroscopes are considerably more rugged than conventional spinning wheel gyroscopes, can be started much more quickly, consume less power and have no bearings (which could be susceptible to wear). A wide variety of vibrating members have been employed in the vibrational gyroscope art, ranging in shape from a tuning fork to a pair of torsionally oscillating coaxial spoked wheels. However, most existing rotary rate gyroscopes are complex devices far less suited for micromechanical scaling.

Many applications exist for extremely small rate gyroscopes that exhibit low drift and offset errors and that are cost effective and rugged. These include head position sensors to control virtual reality displays, control of miniature motors and mechanical arms, control for a ground vehicle or vibration-cancelling suspension, angular accelerometers for guidance systems serving small vehicles or pedestrians, and miniature missile proportional-navigation homing seekers.

Different applications place different requirements on gyroscope system performance and/or application-specific processing. For example, in virtual reality displays or personal guidance systems, the range of rotation rates and the maximum permissible latency in estimation of angle rate are moderate, and the drift must be very low. In contrast, in a proportional-navigation homing seeker the angle-rate range is very large, the latency must be very low and drift rates may be moderately large before system performance degrades.

Micromechanical gyroscopes which are micromachined from a single substrate are well known in the art. By way of example, an angular rate sensor made out of a single piece of quartz was studied by J. Soderkvist and discussed in an article entitled "Design of a Solid-State Gyroscopic Sensor Made of Quartz," Sensors and Actuators, A21 A23, pp. 293–296 (1990). The piezoelectric effect in quartz is used both to excite a reference vibration in the plane of a tuning fork and to sense the vibration normal to this plane due to an externally applied rotation. The amplitude of the second vibration is directly proportional to the angular velocity of the applied rotation.

Another type of micromechanical gyroscope is described by J. Bernstein in U.S. Pat. No. 5,203,208. This Bernstein gyroscope includes a mass symmetrically supported by both drive and sense axes, for detecting rotational movement about an input axis. The gyroscope includes an inertial mass supported by two pairs of flexures. Each pair of flexures is attached to diametrically opposed sides of the inertial mass and a gyroscope support frame. Additionally, each of the flexures is oriented at generally a 45° angle from both the drive axis and the sense axis. In response to an applied drive signal, the inertial mass is induced to vibrate about a drive axis which is co-planar with and orthogonal to the sense axis. Both pairs of flexures participate equally during rotation of the mass.

Still another type of micromechanical gyroscope known in the art comprises a gimbaled structure which includes an inner gimbal ring having a set of flexures coupled to a mass. The inner gimbal ring serves as the sense axis. The innter gimbal ring is located within an outer gimbal ring which serves as the drive axis and is coupled to a gyroscope frame by an outer set of flexures.

Most, if not all, prior micromechanical gyroscopes (including the Bernstein gyroscope) are complex to implement and generally require a relatively large substrate surface area, e.g., on the order of hundreds of microns. Such devices are of a scale significantly larger than today's integrated circuits. Thus, a scaled vibratory rate gyroscope with dimension on the order of microns (for greater compatibility with existing integrated circuits), and which allows performance differences to be addressed, is believed particularly commercially desirable. The present invention provides such a micromechanical gyroscopic sensing device.

DISCLOSURE OF INVENTION

Briefly summarized, the present invention comprises in one aspect a micromechanical gyroscopic sensor array for detecting rotational movement. The sensor array includes a plurality of vibrational microgyroscopic sensing elements fixedly oriented in a common plane relative to one another such that an in-plane direction and an out-of-plane direction orthogonal thereto are defined. Each microgyroscopic sensing element has its own predefined out-of-plane resonant frequency. The sensor array further includes drive means for driving each sensing element at a predetermined in-plane drive frequency, wherein the predetermined in-plane drive frequencies and the predefined out-of-plane resonant frequencies of the sensing elements are such that a range of differences therein exist among the sensing elements. Sensing means is associated with each of the microgyroscopic sensing elements for sensing out-of-plane motion and producing a sense signal representative thereof. Signal processing means is coupled to the sensing means for receiving the sense signal and producing a signal representative of rotational movement experienced by the micromechanical gyroscopic sensor array based upon sensed out-of-plane motion at the plurality of sensing elements.

In another aspect, a micromechanical gyroscope sensor array for detecting rotational movement is provided wherein a plurality of rotation detecting means are fixedly oriented in a common plane relative to one another such that an in-plane direction and an out-of-plane direction orthogonal thereto are defined. Each detecting means has its own predefined out-of-plane resonant frequency. A drive mechanism is associated with each detecting means for driving the detecting means at its own predetermined in-plane drive frequency. The predetermined in-plane drive frequencies of the detecting means and the predefined out-of-plane resonant frequencies of the detecting means are such that there exists a range of differences therein. A plurality of sensing means is also provided, with each sensing means being associated with one of the detecting means for sensing a component of an out-of-plane motion experienced by the associated detecting means and for producing a component sense signal therefrom. Signal processing means is coupled to the plurality of sensing means for producing a signal representative of rotational movement experienced by the micromechanical gyroscopic sensor array through a combination of the component sense signals produced by the plurality of sensing means. Enhanced details of the sensor array are also described and claimed herein.

In yet another embodiment, a method for detecting rotational movement employing a micromechanical gyroscopic sensor array is provided. The sensor array includes a plurality of vibrational sensing elements fixedly oriented in a common plane relative to one another such that an in-plane direction and an out-of-plane direction orthogonal thereto are defined. Each sensing element has its own predefined out-of-plane resonant frequency. The method includes the steps of: driving the plurality of sensing elements at a predetermined in-plane drive frequency, wherein the in-plane drive frequencies of the sensing elements and the predefined out-of-plane resonant frequencies of the sensing elements are selected such that a range of differences therein exists among the sensing elements; experiencing rotational movement at at least some of the plurality of sensing elements; sensing at each sensing element an out-of-plane motion component and producing therefrom a plurality of component sense signals; and combining the component sense signals to produce a signal representative of the rotational movement experienced by the micromechanical gyroscopic sensor array. Process enhancements are also presented.

To restate, a novel micromechanical gyroscopic sensor array is presented which permits increased sensitivity and improved bandwidth over prior mircomechanical vibratory gyroscopic sensing approaches. This invention exploits state-of-the-art photolithographic fabrication techniques to build an array of precisely tuned devices. The array of sensing elements produces significantly improved performance capabilities. By incorporating signal processing electronics into the same substrate, improved performance is attained well beyond that available from simple signal averaging. The gyroscopic sensing array can be produced very inexpensively and can meet a large variety of needs for navigation and accelerometers in both commercial and government applications.

BRIEF DESCRIPTION OF DRAWINGS

These and other objects, advantages and features of the present invention will be more readily understood from the following detailed description of certain preferred embodiments of the present invention, when considered in conjunction with the accompanying drawings in which:

FIG. 1b is an enlarged cutaway portion of the sensor array of FIG. 1a;

BEST MODE FOR CARRYING OUT THE INVENTION

Disclosed and claimed is a novel mechanism and associated signal processing electronics which together provide increased performance sensitivity and bandwidth over prior vibratory gyroscopic sensing approaches. The invention exploits the use of modern photolithographic fabrication techniques to build an array of precisely tuned devices. Presented is a vibratory-rate micro-gyroscope (VRG) sensor array that is scaled for on-chip compatibility with control circuitry in an otherwise conventional VLSI technology. Since the sensitivity and bandwidth of a single VRG element is modest, at best, an array of VRG elements that are similar apart from slight systematic differences between the drive and resonant angular frequencies is employed pursuant to the invention. By combining individual output signals, improved minimum sensitivity and bandwidth are obtained. Further, by incorporating signal processing electronics into the chip array itself, improved performance well beyond that available from simple signal averaging is obtained.

The ability to tune sensitivity and bandwidth through the adjustment of weights in the processing electronics (and the ability to fabricate VRG array components with different spatial orientations) provides a level of flexibility and generality that is beyond the capability of most, if not all, existing micromechanical gyroscopic sensors. The ability to detect prestored patterns of motion, for example, through the use of a neural-network is a natural extension to the approach of the present invention. As noted above, many applications exist for extremely small rate gyros that exhibit low drift and offset errors and that are cost effective and rugged. These include head position sensors to control virtual reality displays and angular accelerometers for guidance systems serving small vehicles or pedestrians.

Figure 1A:
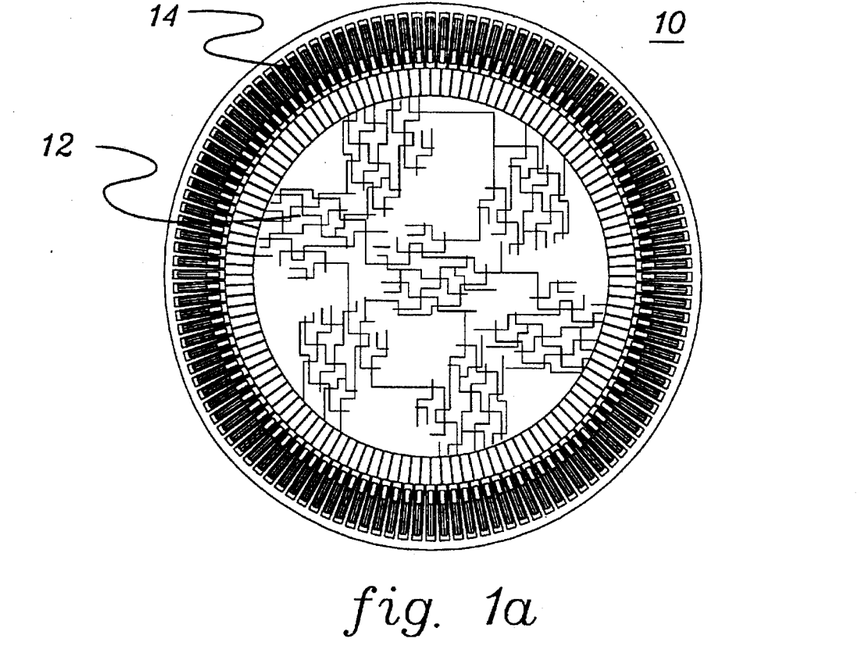
FIG. 1a is a plan view of a micromechanical, vibrational gyroscope sensor array pursuant to the present invention.
Figure 1B:
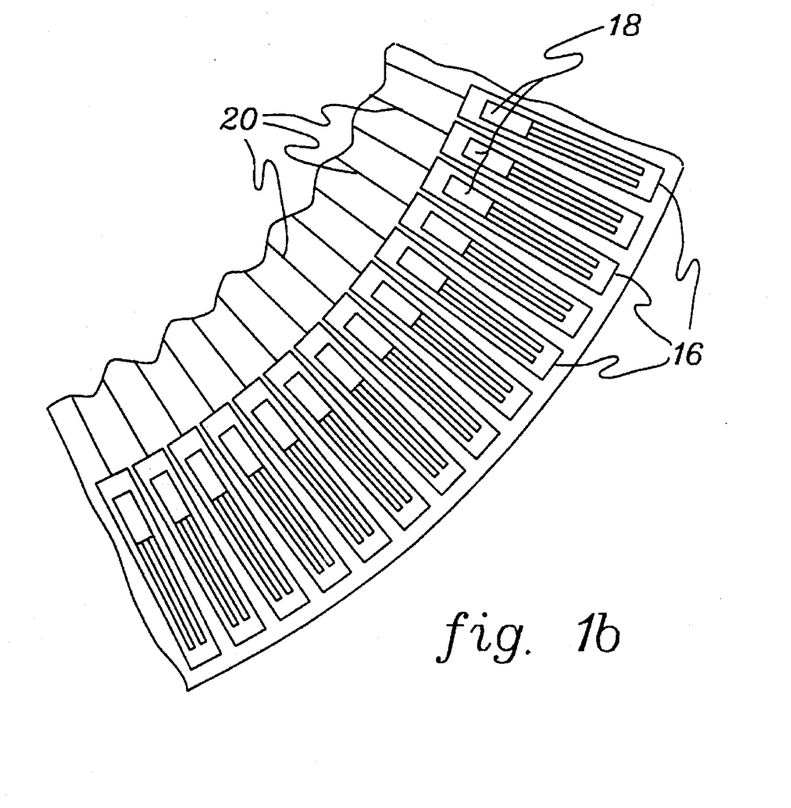

Referring now to the figures, and in particular to FIGS. 1a & 1b, wherein one embodiment of a vibratory rate microgyroscopic sensor array pursuant to the present invention is shown. In this embodiment, array 10 has an inner circular area 12 containing conventional integrated circuits, including control circuitry for the sensor array, and an outer ring area 14 containing a plurality of microgyroscopic sensing elements 16 pursuant to the present invention. The microgyroscopic device 16 corresponding to an actual rotational axis will respond strongest at the drive frequency. In this embodiment, each micro-gyroscopic sensing element 16 comprises a mechanical tuning fork 18, which is coupled via line 20 to respective control circuitry (not shown) in inner circular area 12 of sensor array 10.

The configuration depicted in FIGS. 1a & 1b, which is believed beneficial if sensing motion in any direction, is provided by way of example only. Many other configurations could alternatively be employed. For example, all the micro-gyroscopic sensing elements could be oriented parallel to one another within the substrate rather than the spacedly distributed configuration depicted. Note, however, that in all embodiments a common plane is defined by the sensing elements.

In simplest form, a VRG sensing element consists of a tuning fork with forced anti-phase vibrations within the plane defined by the two tines. As the tine plane rotates, Coriolis forces induce anti-phase out-of-plane vibrations with an amplitude proportional to the rate of rotation. A compact VRG sensing element design features a resonant angular frequency of the fundamental in-plane vibration mode of $1.3 \times 10^6$ rad/sec (200 kHz) for a tine length and width of 120 μm and 2 μm, respectively. Vibrations are induced by capacitive coupling with two actuator electrodes, and large amplitudes are possible for a large-Q system. When the tines are formed from silicon (or polysilicon), Q factors greater than $10^6$ are possible.

A resonant-gate transistor (RGT), discussed below, offers a good means for detecting out-of-plane oscillations in a very small VRG sensing element, since it relies on capacitance per unit area (as opposed to total capacitance) and is easily fabricated. In one design (discussed below), one of the tuning-fork tines serves as a polysilicon gate electrode that is separated from an $SiO_2$-covered channel region below it. Calculations indicate that the RGT will produce a minimum drain current of 0.5 μA in response to a (modest) minimum turn rate of 0.1 degree/sec.

The large Q needed to achieve reasonable VRG sensing element response leads to a narrow bandwidth, specifically about 1 Hz for the minimum turn rate given above. Any re-design for improved detection leads to narrower bandwidth through an even tradeoff.

Given these limitations for a single VRG sensing element, the present invention improves overall performance by utilizing an array of VRG elements and combining their signals. On the basis of a simple system model, the tradeoff between sensitivity and bandwidth becomes a familiar problem in detector design. However, the detector is constrained by a specific mechanical configuration, and it cannot be designed with optimal, or matched, spectral characteristics as for a single device.

For the case of an angular velocity input signal with a particular frequency spectrum and bandwidth, the detection of a signal in noise can be optimized by designing a filter with the same frequency spectrum as the input. A desired characteristic can be achieved through a weighted combination of signal outputs from an array of VRG sensing elements that have slightly different resonant angular sense frequencies with a constant angular drive frequency (or slightly different angular drive frequencies with a constant angular resonant frequency). (In a sense, the frequency spectrum of the input signal is sampled by coupling with a selected component to induce a tuning-fork excitation. For each of many oscillators, a high Q factor excludes the influence of frequency components outside a narrow range.) Details of the related calculations are presented below, and the results suggest that an array of M sensors leads to an M-fold improvement in the sensitivity/bandwidth tradeoff. Thus, an array of 100 VRG sensing elements is discussed herein to detect 0.01 degree/sec motion with a bandwidth of 10 Hz.

The ability to tune sensitivity and bandwidth through the adjustment of weights in the processing electronics (and the ability to fabricate VRG array components with different spatial orientations) provides a level of flexibility and generality that is beyond the capability of any pre-existing micromechanical gyroscope sensor. Detection of prestored patterns of motion, as well as the learning of new patterns, is also within the scope of the invention. In particular, the use of neural-network learning methods is a natural extension for incorporating the VRG sensor array into sophisticated motion monitoring and control applications.

In the proposed tunable system, a feedforward neural net is used to tune weighting parameters for a set of subarrays in each two-dimensional module, and a backpropagation algorithm is used to tune the weights in response to a series of motion examples. The net learns to recognize and/or discriminate among characteristic motions for a given application using inherent properties of the array.

It is instructive to consider VRG sensor sensitivity as tuning-fork dimensions are decreased. For the case of a tuning-fork oscillator with linear damping, the steady-state ratio of the out-of-plane (sense) and in-plane (drive) amplitudes is given by equation (1):

$$\frac{A'}{A} = \frac{2\Omega_o \omega_c}{\sqrt{(\omega_c^2 - \omega_s^2)^2 + (2\omega_c \omega_s/Q)^2}}, \quad (1)$$

where $\Omega_o$ is the angular rate of rotation, $\Omega_c$ is the angular drive frequency, $\omega_s$ is the resonant angular sense frequency, and Q is the resonance quality factor. In the limit as $\omega \to \omega_s$, this reduces to:

$$\frac{A'}{A} = Q \frac{\Omega_o}{\omega_s}, \quad (2)$$

However, for the resonant sense frequency:

$$\omega_s \approx \frac{t}{l^2} \sqrt{\frac{Y}{\rho}}, \quad (3)$$

where t, l, Y and ρ are the tine thickness, length, Young's modulus and density, respectively. In turn:

$$\frac{A'}{A} \approx \Omega_o Q \frac{l^2}{t} \sqrt{\frac{\rho}{Y}}, \quad (4)$$

The conclusion drawn from equation (4) is that downscaling necessitates a system with large Q in order to avoid poor sensitivity. In vacuum, intrinsic Q factors can be as high as $10^6$ for materials such as silicon and quartz. At atmospheric pressure, downscaling actually reduces Q when geometries are sufficiently small to make the viscous effects of air significant.

Unfortunately, large Q implies a VRG sensing element with small bandwidth $B_s$, through the relation:

$$B_s = \frac{\omega_c}{2Q}. \quad (5)$$

Further, equations (2) & (5) imply a tradeoff of the form:

$$\frac{A'}{A} B_s \approx \frac{\Omega_o}{2}, \quad (6)$$

since $\omega_c \approx \omega_s$. So taking A'/A=0.001 (a conservative value) and $\Omega_o$ consistent with a rotation rate of 0.1 degree/sec, the bandwidth is only about 1 Hz. The minimum A'/A=0.001 that maintains acceptable signal to noise ratio will depend on many design factors. Nevertheless, the tradeoff of equation (6) represents a problem for individual VRG sensing elements that are scaled for integration with VLSI control circuitry.

Control algorithms and signal processing discussion for a vibratory microgyroscope sensor array pursuant to the present invention are next presented.

Figure 2:
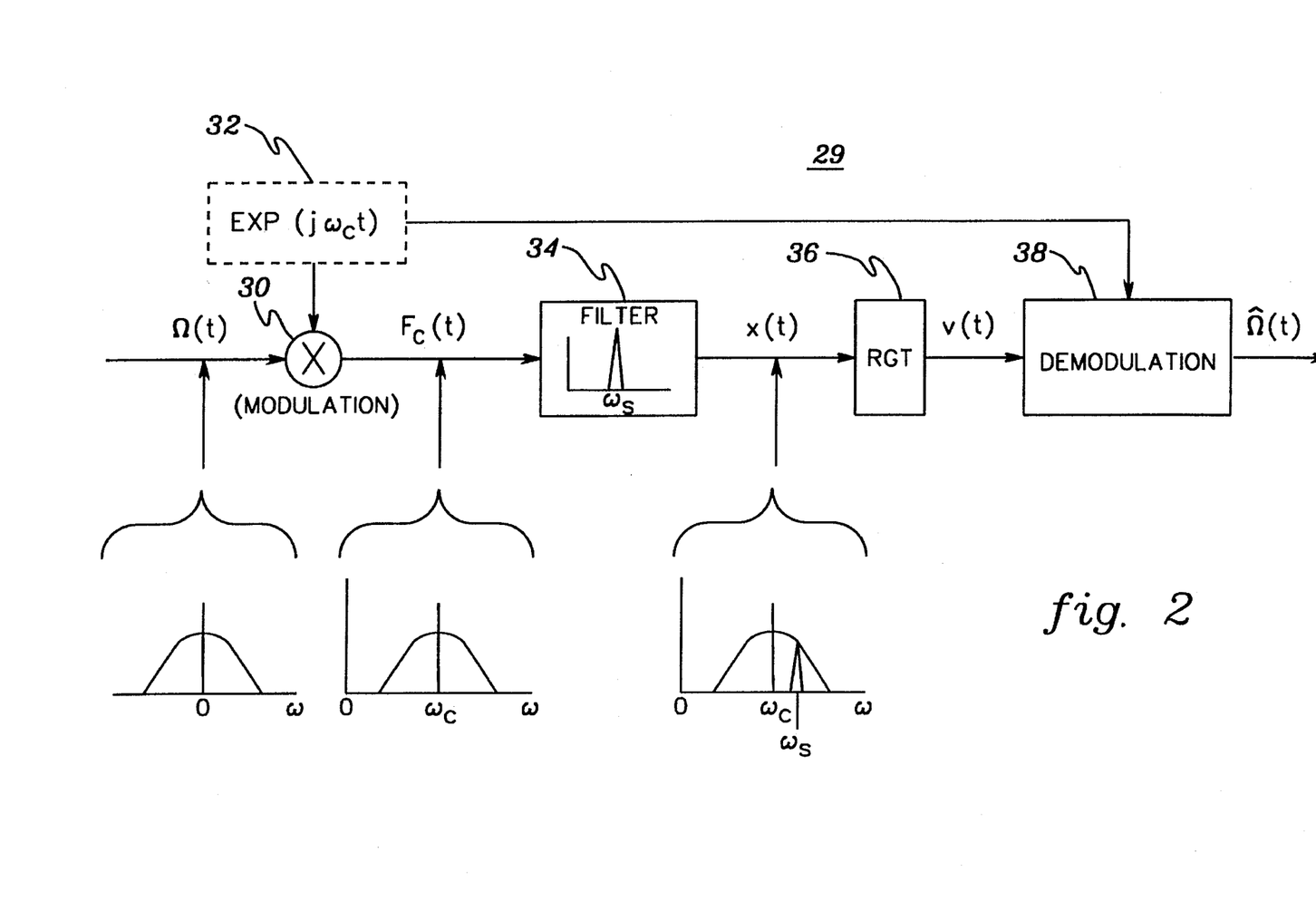
FIG. 2 is a diagram of one embodiment of signal processing for one microgyroscopic sensing element pursuant to the present invention.

Given the limitations that are characteristic of a single VRG sensor (described above), the present invention improves the overall performance by utilizing an array of VRG elements and combining their signals in an appropriate way (discussed below). One VRG signal processing model, denoted 29, is shown in FIG. 2. The Coriolis force, $$F_c = -K\Omega(t)\exp(j\omega_c t), \tag{7}$$

reflects the modulation 30 of the in-plane vibrations (the carrier signal ($\exp(j\omega_c t)$ 32)) by an angular velocity signal ($\Omega(t)$). This is "detected" by a sharply tuned filter 34 (the high-Q out-of-plane vibration mode), converted to a voltage signal (by means of a resonant-gate transistor (RGT) 36, described below), and then demodulated 38 using a synchronous detector at the same known driving frequency ($\exp(j\omega_c t)$ 32). From this perspective, the tradeoff between sensitivity and bandwidth becomes a familiar problem in detector design. However, the detector of this system is constrained by a specific mechanical configuration, and there is no option of designing it with optimal, or matched, spectral characteristics as for a single device.

Consider an angular velocity input signal $\Omega(t)$ with frequency spectrum $\Psi(\omega)$ and bandwidth $B_\Omega$, where $B_s \ll B_\Omega \ll \omega_c$. In order to optimize the detection of signal in noise over $B_\Omega$, a filter with frequency characteristic $\Psi(\omega)$ is desired. The characteristic can be achieved through a weighted combination of signal outputs from an array of VRG sensors that have slightly different resonant angular sense frequencies.

Figure 3:
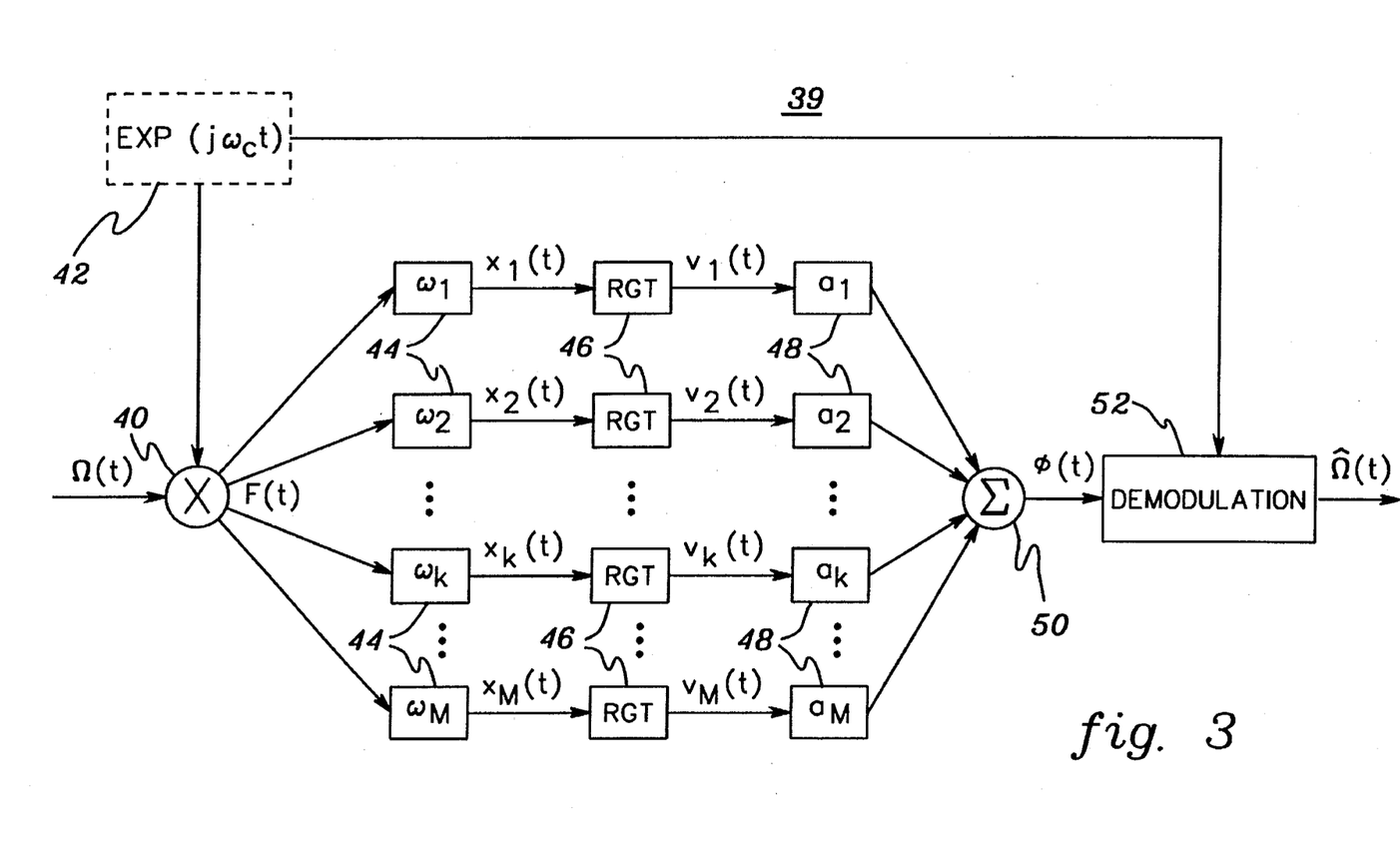
FIG. 3 is a diagram of one embodiment of signal processing for M sensing elements of a gyroscope sensor array pursuant to the present invention, wherein each sensing element is assigned its own weighting factor.

FIG. 3 shows the proposed design of a matched filter spectral array 39. The input to each sensor $s_k$ (via modulation 40) is the angular velocity $\Omega(t)$, and, for simplicity, the in-plane modes of oscillation are driven ($\exp(j\omega_c t)$ 42) at a common angular frequency $\omega_c$. Thus, the resulting Coriolis force signals are given by equation (7) with frequency spectra $$F_c(\omega) = \rho(\omega - \omega_c). \tag{8}$$

The frequency responses of the out-of-plane vibration modes are different for each sensor 44 in the array 39:

$$G_k(\omega) = B(\omega - \omega_k). \tag{9}$$

Therefore, the spectral content of the voltage output from each RGT device 46 has the form $$V_k(\omega) = G_k(\omega) F_c(\omega). \tag{10}$$

Finally, the voltage signals are weighted 48 by a respective $a_k$ factor, the resulting output from the array is summed 50 and finally demodulated 52. The output can be stated as:

$$\Phi(\omega) = \overset{M}{\Sigma} a_k B(\omega - \omega_k) \psi(\omega - \omega_c) \tag{11}$$

$$= \psi(\omega - \omega_c) \overset{M}{\Sigma} a_k B(\omega - \omega_c - \Delta\omega),$$

where $\Delta\omega = \omega_k - \omega_c$.

At this point an arbitrary filter function, $H(\omega)$, with bandwidth less than $B_\Omega$, can be chosen and approximated as a weighted sum of narrow bandwidth functions:

$$H(\omega) \approx \overset{M}{\Sigma} b_k B(\omega - \Delta\omega). \tag{12}$$

By choosing $a_k = b_k$ in the sensor array, equation (13) is obtained:

$$\Phi(\omega) \approx \psi(\omega - \omega_c) H(\omega - \omega_c). \tag{13}$$

In practice, function $H(\omega)$ can be chosen to be approximately equal to the spectral content of the angular velocity variations to be sensed, i.e., $$H(\omega) \approx \Omega(\omega), \tag{14}$$

which effectively yields a matched filter characteristic from the array. The resulting composite signal is then demodulated using $\omega_c$ as shown in FIG. 3.

Figure 4:
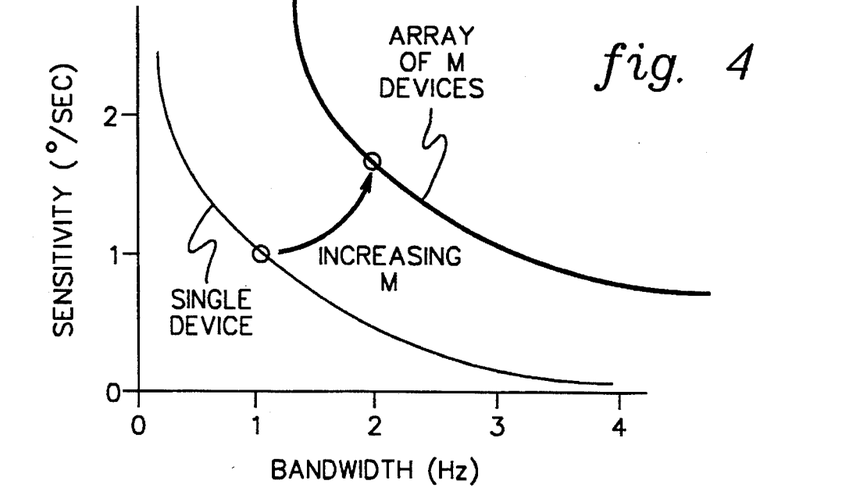
FIG. 4 is a representative graph of sensitivity versus bandwidth for a single sensing element and for an array of M sensing elements pursuant to the present invention.

The net effect of an array of sensors is to change the sensitivity/bandwidth tradeoff of equation (6) to a new relation of the form:

$$\frac{A'}{A} B_s \approx W(M) \frac{\Omega_o}{2}, \tag{15}$$

where (to first order) $W(M) = M$. Thus, the tradeoff curve is shifted as shown in FIG. 4, and the performance operating point can be adjusted through appropriate sensor and signal processing design. Assuming the $A'/A = 0.001$ VRG sensitivity limit used in the previous calculation, an array of 100 VRG sensing elements can detect 0.01 degree/sec with a bandwidth of 10 Hz.

Note that in practice, the angular resonant sense frequencies of the out-of-plane VRG vibration modes will be difficult to control within tight bounds. Thus, multiple drive frequencies are anticipated, and the signal processing algorithm will be somewhat more complicated. Nevertheless, the conclusion on the merits of array processing remains unchanged.

The ability to tune sensitivity and bandwidth through the adjustment of weights in the processing electronics (and the ability to fabricate VRG array components with different spatial orientations) provides a level of flexibility and generality that is beyond the capability of most pre-existing gyroscope sensors. Detection of prestored patterns of motions, as well as learning of new patterns, are within the scope of the present invention. In particular, the use of neural-network learning methods is a natural approach for incorporating the VRG sensor array into sophisticated motion monitoring and control applications.

Figure 5:
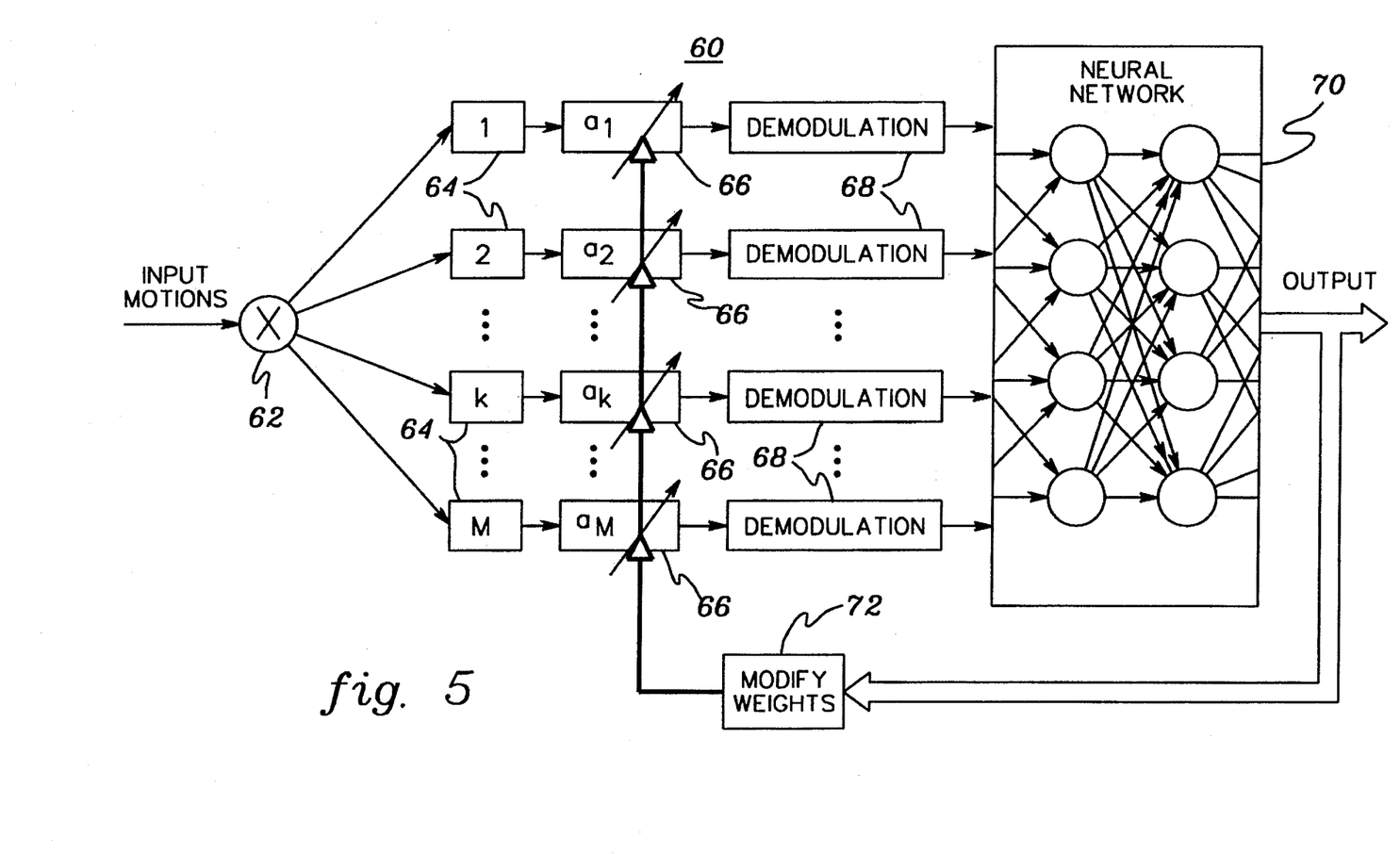
FIG. 5 is a diagram of one enhanced embodiment of signal processing pursuant to the present invention wherein a neural net is employed so that a micromechanical gyroscope sensor array can learn pattern recognition.

FIG. 5 shows a block diagram of a proposed tunable system, denoted 60. A feed-forward neural net would be used to tune weighting parameters 66 for a set of subarrays 64 in each two-dimensional module, and a backpropagation algorithm 70 would tune the weights 72 in response to a series of motion examples. The net would learn to recognize and/or discriminate among characteristic motions for a given application using inherent properties of the array.

Apart from the development of signal processing algorithms that improve the sensitivity/bandwidth tradeoff (as described above), the success of the present invention is dependent on the design of the VRG sensor. An objective of this invention is to allow for fabrication of a device that is sufficiently small to provide on-chip compatibility with adjacent control circuitry.

Figure 6:
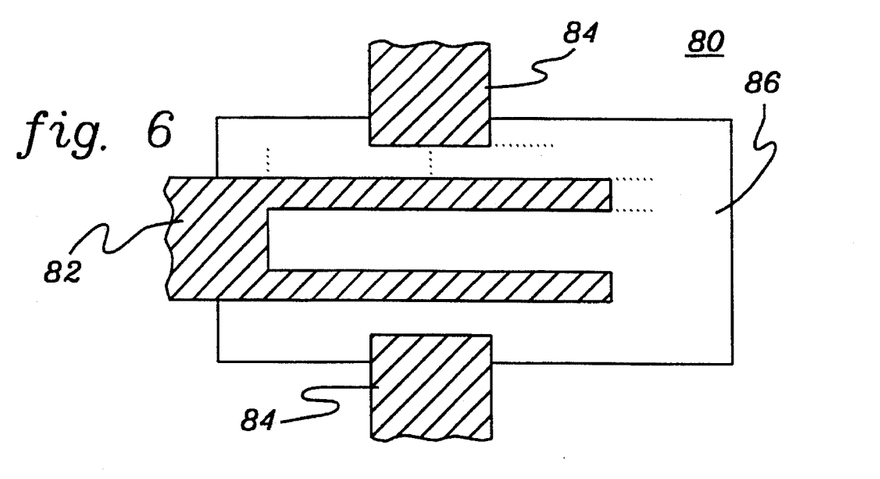
FIG. 6 is a plan view of one embodiment of a micromechanical sensing element pursuant to the present invention.

FIG. 6 is a plan view of one embodiment of a VRG sensor 80. Sensor 80 includes a tuning fork 82 and a two-electrode actuator 84, which are both fabricated from a thin-film sandwich consisting of a Si substrate, a 2-μm-thick layer of $SiO_2$ and a 2-μm-thick layer of heavily doped polysilicon. The polysilicon film is sufficiently thin to allow precise component definition by anisotropic reactive-ion etching, and subsequent chemical etching removes portions 86 of the exposed $SiO_2$ so that the tuning fork is free to vibrate. The latter etch will tend to undercut a photoresist masking layer in peripheral regions without causing difficulty. Indeed, a substantial undercut at the base of the tuning fork improves the isolation of its vibrational modes.

The resonant angular frequency of the fundamental in-plane vibration mode is $1.3 \times 10^6$ rad/sec (200 kHz) for a tine length and width of 120 µm and 2 µm, respectively. Vibrations are induced by capacitive coupling with the two actuator electrodes, and large amplitudes are possible for the large-Q system. Since the polysilicon film thickness is 2 µm, the fundamental resonant angular frequency of the out-of-plane vibration mode is close to that for the in-plane mode. Nevertheless, the degree of mismatch must be controlled. In one approach, the necessary adjustment could be made using an ion implantation process.

In the preceding discussion, the steady-state VRG sensitivity is expressed by equation (1). If it is further assumed that $\omega_c^2 - \omega_s^2 \approx 2\omega_c(\omega_c - \omega_s)$ and $\omega_c - \omega_s = \alpha \omega_s$, then:

$$\frac{A'}{A} = \frac{\Omega_o / \omega_s}{\sqrt{\alpha^2 + 1/Q^2}} . \tag{16}$$

To achieve a minimum $A'/A=0.001$ with $\omega_0=1.8 \times 10^{-3}$ rad/sec (0.1 degree/sec), inequality (17) is required:

$$\sqrt{\alpha^2 + 1/Q^2} < 1.4 \times 10^{-6}, \tag{17}$$

which is consistent with $\alpha=1 \times 10^{-6}$ and $Q>1 \times 10^6$. The latter condition is typical for a silicon tine in a vacuum (sealed) environment.

The $\alpha$ parameter is significant for a single VRG sensing element, but it is not crucial when many VRG elements participate in a signal processing array. In such a case, the difference between $\omega_c$ and $\omega_s$ should be kept to one of many constants for each VRG tuning fork so that a particular frequency component of the $\Omega(t)$ spectrum can induce an excitation. Circuitry that maintains a specified $\omega_c - \omega_s$ is straightforward to one of ordinary skill in the art, and factors such as $\omega_s$ temperature drift can be accommodated.

The resonant-gate transistor (RGT) offers a preferred means for detecting out-of-plane oscillations in a very small VRG element, since, as already noted it relies on capacitance per unit area (as opposed to total capacitance) and is easily fabricated. In RGT embodiment 90 of FIG. 7, one of the tuning-fork tines 100 serves as a polysilicon gate electrode that is separated (by distance "h") from an SiO$_2$-covered 98 channel region with length L extending between a source 94 and a drain 96 formed in a substrate 92.

Figure 7:
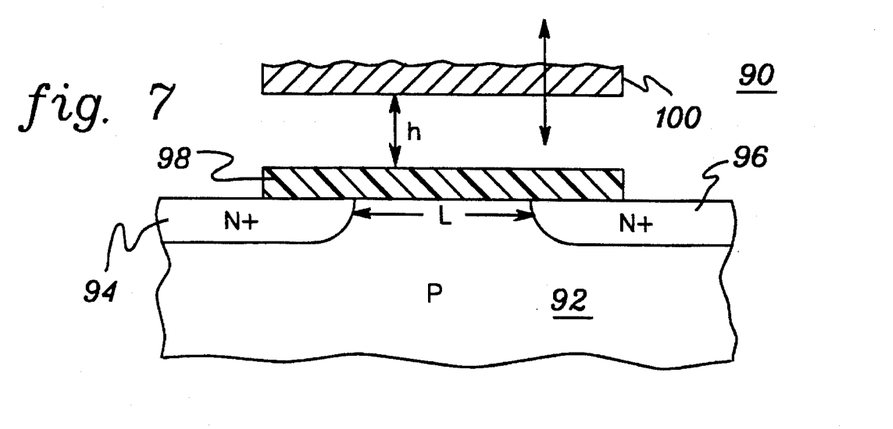
FIG. 7 is a cross-sectional elevational view of one embodiment of a resonant gate transistor useful pursuant to the present invention in determining vibration of an associated micromechanical sensing element such as that of FIG. 6.

When operated in saturation, such that $v_{ds} > v_{gs} - V_T$, the RGT drain current is $$i_d = \frac{1}{2} \mu_e C \frac{W}{L} (v_{gs} - V_T)^2, \tag{18}$$

where $\mu_e$ is the electron surface mobility (600 cm$^2$/V-sec), and C is the areal (per-unit-area) gate-to-substrate capacitance. The latter is given by $$C = \frac{C' C_{ox}}{C' + C_{ox}}, \tag{19}$$

where $C'=\epsilon_o/h$ and $C_{ox}=\epsilon_{ox}/t_{ox}$. In general, $C' \ll C_{ox}$, so $C \approx C'$.

The RGT threshold voltage ($V_T$) is also dependent on C. Specifically, $$V_T = \phi_{ms} - \frac{Q_i}{C} + 2\phi_f + \sqrt{2} \left( \frac{kT}{q} \right) \frac{C_{fb}}{C} \sqrt{2q \frac{\phi_f}{kT}}, \tag{20}$$

where $\phi_{ms}$ is the gate/substrate work-function difference, $2\phi_f$ is the inversion potential, $C_{fb}$ is the flat-band capacitance, $Q_i$ is the effective charge density at the insulator/substrate interface, and kT/q is the thermal voltage (26 mV). For the case of a Si substrate with $1 \times 10^{15}$ cm$^{-3}$ p-type doping, $\phi_{ms}=-0.85$ V, $2\phi_f=0.58$ V, and $C_{fb}=0.08$ µF/cm$^2$. Typically, $Q_i/q=5 \times 10^{10}$ cm$^3$. Unlike the case for "conventional" MOS transistors, $V_T$ tends to be large, since C is small. (For example, with h=2 µm, $V_T \approx 13$ V.) Thus, it is necessary to maintain good $Q_i$ process control in order to avoid wide variations in $V_T$.

The RGT sensitivity is given by $$S = \frac{\partial i_d}{\partial h} = \frac{\partial i_d}{\partial C} \frac{\partial C}{\partial h}, \tag{21}$$

or $$S = -\frac{1}{2} \mu_e \frac{W}{L} \frac{C}{h} (v_{gs} - V_T) \left[ v_{gs} - V_T + 2\sqrt{2} \left( \frac{kT}{q} \right) \frac{C_{fb}}{C} \sqrt{\frac{2q\phi_f}{kT}} - \frac{2Q_i}{C} \right] \tag{22}$$

Then assuming $V_T \gg 2\phi_{ms} + 4\phi_f$, equation (23) is obtained:

$$S \approx -\frac{1}{2} \mu_e \frac{W}{L} \frac{C}{h} (v_{gs}^2 - V_T^2). \tag{23}$$

With $v_{gs}=18$ V, h=2 µm and W/L=10, equation (22) yields S=0.1 mA/µm.

In earlier calculations, a sensitivity was chosen such that $A'/A=0.001$. Thus, if A=5 µm and $A'=\Delta h=0.005$ µm, $\Delta i_d$ (minimum)=0.5 µA. This is more than adequate for signal-processing circuitry. Indeed, it should be possible to accommodate smaller values of $A'/A$ by correlating the two anti-phase RGT signals.

The preceding discussion assumed that the RGT gate is directly above the channel region and that fringing fields can be neglected. In practice, the gate is in lateral motion, and the RGT drain-current response is a pulse with h-dependent amplitude.

The preceding discussion also assumed an open-loop condition that can lead to a saturated output signal when $\Omega$ is very large. For some applications, it may be desirable to maintain a closed-loop condition in which the output signal is the voltage that must be applied to an actuator plate (not shown in FIG. 6) in order to offset the effect of the Coriolis force. Alternatively, VRG arrays that respond to different ranges of amplitude can be fabricated adjacent to one another. This allows a much simpler system.

It will be observed from the above discussion that a novel micromechanical gyroscopic sensor array is presented which permits increased sensitivity and improved bandwidth over prior mircomechanical vibratory gyroscopic sensing techniques. The invention exploits state-of-the-art photolithographic fabrication techniques to build an array of precisely tuned devices. An array of sensing elements produces significantly improved performance capabilities. By incorporating signal processing electronics onto the same substrate, improved performance its attained well beyond that available from simple signal averaging. The gyroscopic sensing array can be produced very inexpensively and can meet a large variety of needs for navigation and accelerometers in both commercial and government applications.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

We claim:

1. A micromechanical gyroscopic sensor array for detecting rotational movement, said sensor array comprising:

a plurality of vibrational microgyroscopic sensing elements fixedly oriented in a common plane relative to one another such that an in-plane direction and out-of-plane direction orthogonal thereto are defined, each microgyroscopic sensing element of said plurality of vibrational microgyroscopic sensing elements having an associated predefined out-of-plane resonant frequency;

means for driving said each microgyroscopic sensing element at a predetermined in-plane drive frequency, wherein the respective predetermined in-plane drive frequencies of said plurality of vibrational microgyroscopic sensing elements and the associated predefined out-of-plane resonant frequencies of said plurality of vibrational microgyroscopic sensing elements are such that various frequency differences exist between the respective predetermined in-plane drive frequencies and the associated predefined out-of-plane resonant frequencies amongst said plurality of vibrational microgyroscopic sensing elements;

sensing means, associated with said each microgyroscopic sensing element of said plurality of vibrational microgyroscopic sensing elements, for sensing out-of-plane motion of said each microgyroscopic sensing element and producing a corresponding sense signal therefrom; and signal processing means coupled to said sensing means for producing a combined signal representative of rotational movement experienced by the micromechanical gyroscopic sensor array based upon said associated sense signals produced by said sensing means from said out-of-plane motion experienced by said plurality of vibrational microgyroscopic sensing elements.

2. The micromechanical gyroscopic sensor array of claim 1, wherein each of said plurality of vibrational microgyroscopic sensing elements has substantially the same predefined out-of-plane resonant frequency and at least two of said plurality of vibrational microgyroscopic sensing means have unique predetermined in-plane drive frequencies such that a range of drive frequency differences exists between associated out-of-plane resonant frequencies and respective in-plane drive frequencies amongst said plurality of vibrational microgyroscopic sensing elements.

3. The micromechanical gyroscopic sensor array of claim 1, wherein at least two of said plurality of vibrational microgyroscopic sensing elements have unique predefined out-of-plane resonant frequencies and said each microgyroscopic sensing element of said plurality of vibrational microgyroscopic sensing elements has substantially the same predetermined in-plane drive frequency, said unique predefined out-of-plane resonant frequencies having frequency differences with respect to one another.

4. The micromechanical gyroscopic sensor array of claim 1, wherein the associated predefined out-of-plane resonant frequencies of at least two of said plurality of vibrational microgyroscopic sensing elements are unique and the respective predetermined in-plane drive frequencies of at least two of said plurality of vibrational microgyroscopic sensing elements are unique such that differences in the out-of-plane resonant frequencies and differences in the in-plane drive frequencies exist among said plurality of vibrational microgyroscopic sensing elements.

5. The micromechanical gyroscopic sensor array of claim 1, wherein said each microgyroscopic sensing element of said plurality of vibrational microgyroscopic sensing elements and said associated sensing means share at least one common electrode.

6. The micromechanical gyroscopic sensor array of claim 5, wherein said each microgyroscopic sensing element comprises a micromechanical tuning fork having two tines.

7. The micromechanical gyroscopic sensor array of claim 6, wherein for said each microgyroscopic sensing element, said at least one common electrode shared by said associated sensing means is disposed adjacent one of said two tines.

8. The micromechanical gyroscopic sensor array of claim 1, wherein said sensing means includes a resonant gate transistor associated with said each microgyroscopic sensing element.

9. The micromechanical gyroscopic sensor array of claim 1, wherein said plurality of vibrational microgyroscopic sensing elements are arranged in a circular ring in said common plane and wherein an inner area of substrate is defined within said circular ring defined by said plurality of vibrational microgyroscopic sensing elements, said inner area containing integrated control circuitry for at least two of said driving means, said sensing means and said signal processing means.

10. The micromechanical gyroscopic sensor array of claim 1, further comprising means for weighing out-of-plane motion sensed by at least two of said plurality of vibrational microgyroscopic sensing elements.

11. The micromechanical gyroscopic sensor array of claim 10, wherein said weighing means is adjustable and said sensor array further includes neural network means and feedback circuitry, said neural network means being connected to receive said sense signals from said sensing means for monitoring said sense signals with references to prestored patterns of motion and for learning new patterns thereof, and said feedback circuitry being coupled between said neural network means and said adjustable weighing means for feedback adjusting the weighing of said weighing-means based on the monitoring of said neural network means.

12. The micromechanical gyroscopic sensor array of claim 1, wherein multiple sense signals from respective sensing means are produced based on said out-of-plane motion experienced by said plurality of vibrational microgyroscopic sensing elements, and wherein said signal processing means constructs said combined signal representative of rotational movement experienced by the micromechanical gyroscopic sensor array through a combination of said multiple sense signals.

13. A micromechanical gyroscope sensor array for detecting rotational movement, said sensor array comprising:

a plurality of rotation detecting means fixedly oriented in a common plane relative to one another such that an in-plane direction and an out-of-plane direction orthogonal thereto are defined, each rotation detecting means of said plurality of rotational detecting means having an associated predefined out-of-plane resonant frequency;

means for driving said each rotation detecting means at an associated predetermined in-plane drive frequency, wherein the respective predetermined in-plane drive frequencies of said plurality of rotation detecting means and the respective predefined out-of-plane resonant frequencies of said plurality of rotation detecting means provide various frequency differences between the respective predetermined in-plane drive frequencies and the corresponding predefined out-of-plane resonant frequencies amongst said plurality of rotation detecting means;

a plurality of sensing means, each sensing means of said plurality of sensing means being associated with one rotation detecting means of said plurality of rotation detecting means for sensing a component of an out-of-plane motion experienced by said associated detecting means and for producing a component sense signal therefrom; and signal processing means coupled to said plurality of sensing means for producing a combined signal representative of rotational movement experienced by the micromechanical gyroscopic sensor array by combining said component sense signal produced by each sensing means of said plurality of sensing means.

14. The micromechanical gyroscope sensor array of claim 13, wherein said each sensing means comprises a resonant gate transistor associated with said one rotation detecting means of said plurality of rotation detecting means.

15. The micromechanical gyroscope sensor array of claim 14, wherein said each resonant gate transistor and said one rotation detecting means have a common electrode.

16. The micromechanical gyroscope sensor array of claim 13, further comprising means for weighing at least two of said component sense signals produced by said plurality of sensing means.

17. The micromechanical gyroscope sensor array of claim 16, wherein said weighing means is adjustable and said sensor array further includes neural network means and feedback circuitry, said neural network means being connected to receive said component sense signals from said plurality of sensing means for monitoring said sense signals with references to prestored patterns of motion and for learning new patterns thereof, and said feedback circuitry being coupled between said neural network means and said adjustable weighing means for feedback adjusting of said weighing means based upon the monitoring of said neural network means.

18. The micromechanical gyroscope sensor array of claim 13, wherein each of said detecting means includes a micromechanical tuning fork having two tines.

19. A method for detecting rotational movement employing a micromechanical gyroscopic sensor array, said sensor array including a plurality of vibrational sensing elements fixedly oriented in a common plane relative to one another such that an in-plane direction and an out-of-plane direction orthogonal thereto are defined, each vibrational sensing element of said plurality of vibrational sensing elements having an associated predefined out-of-plane resonant frequency, said method comprising the steps of:

(a) driving said plurality of vibrational sensing elements at associated predetermined in-plane drive frequencies, said in-plane drive frequencies of said plurality of vibrational sensing elements and said associated predefined out-of-plane resonant frequencies of said plurality of vibrational sensing elements providing various frequency differences between respective in-plane drive frequencies and corresponding out-of-plane resonant frequencies among the plurality of vibrational sensing elements;

(b) experiencing rotational movement by at least two of said plurality of vibrational sensing elements;

(c) sensing at each vibrational sensing element of said plurality of vibrational sensing elements an out-of-plane motion component and producing therefrom a component sense signal; and (d) combining said component sense signal of said each vibrational sensing element to produce a signal representative of the rotational movement experienced by the micromechanical gyroscopic sensor array.

20. The method of claim 19, further comprising the step of assigning an associated weight to the out-of-plane motion component sensed at said each vibrational sensing element in said sensing step (c).

21. The method of claim 20, wherein said weight assigning includes assigning adjustable weights to each of said out-of-plane motion components sensed at said sensing elements in said sensing step (c) and wherein said method further includes the step of subsequently intelligently adjusting said assigned weights based on the plurality of component sense signals produced in said sensing step (c).

* * * * *

UNITED STATES PATENT AND TRADEMARK OFFICE
CERTIFICATE OF CORRECTION

PATENT NO. : 5,465,620
DATED : Nov. 14, 1995
INVENTOR(S) : Sanderson et al.

It is certified that error appears in the above-indentified patent and that said Letters Patent is hereby corrected as shown below:

Column 6, line 18, delete "$\Omega_c$" and substitute therefor --$\omega_c$--.

Column 6, line 20, delete "$\omega \rightarrow \omega_3$" and substitute therefor --$\omega \rightarrow \omega_s$--.

Columnn 7, line 36, delete

"$F_c(\omega) = \rho(\omega - \omega_c).$"

and substitute therefor

--$F_c(\omega) = \psi(\omega - \omega_c).$--

Column 9, line 24, delete "$\omega_o$" and substitute --$\Omega_o$--.

Signed and Sealed this

Fifth Day of March, 1996

Attest:

BRUCE LEHMAN

Attesting Officer

Commissioner of Patents and Trademarks